US010764939B2

(12) United States Patent
Liu

(10) Patent No.: US 10,764,939 B2
(45) Date of Patent: Sep. 1, 2020

(54) NETWORK FUNCTION PROCESSING METHOD AND RELATED DEVICE

(71) Applicant: HUAWEI TECHNOLOGIES CO., LTD., Shenzhen, Guangdong (CN)

(72) Inventor: Jianning Liu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 3 days.

(21) Appl. No.: 16/287,395

(22) Filed: Feb. 27, 2019

(65) Prior Publication Data
US 2019/0200400 A1 Jun. 27, 2019

Related U.S. Application Data

(63) Continuation of application No. PCT/CN2016/097526, filed on Aug. 31, 2016.

(51) Int. Cl.
H04W 76/10 (2018.01)
H04L 12/24 (2006.01)
H04L 12/46 (2006.01)

(52) U.S. Cl.
CPC ......... *H04W 76/10* (2018.02); *H04L 12/4641* (2013.01); *H04L 41/046* (2013.01); *H04L 41/0896* (2013.01)

(58) Field of Classification Search
CPC ..... H04W 76/10; H04W 76/18; H04W 76/19; H04W 76/11; H04L 41/046; H04L 12/4641
See application file for complete search history.

(56) References Cited

U.S. PATENT DOCUMENTS

2017/0187572 A1    6/2017  Wu et al.
2017/0257276 A1*   9/2017  Chou .................. H04L 41/0896
2018/0013586 A1    1/2018  Wang

FOREIGN PATENT DOCUMENTS

CN    104410672 A    3/2015
CN    104734931 A    6/2015
(Continued)

OTHER PUBLICATIONS

ETSI GS NFV-SWA 001 V1.1.1 (Dec. 2014),Network Functions Virtualisation (NFV);Virtual Network Functions Architecture,total 93 pages.
(Continued)

Primary Examiner — Ashley Shivers
(74) Attorney, Agent, or Firm — Womble Bond Dickinson (US) LLP

(57) ABSTRACT

The disclosure discloses systems and methods for network function processing. In one embodiment, a method includes: separately sending, by a network function agent module in an enhanced VNF entity, a reconstruction request to a physical network element management module and a virtual network element management module. The request includes connection point information. The method further includes receiving, by a PNF entity in the enhanced VNF entity, a first connection instruction sent by the physical network element management module, and establishing a connection to the network function agent module based on connection point information in the first connection instruction. The method additionally includes receiving, by a VNF entity in the enhanced VNF entity, a second connection instruction sent by the virtual network element management module, and establishing a connection to the network function agent module based on connection point information in the second connection instruction. By using the systems and methods
(Continued)

disclosed herein, resource utilization and reliability of hybrid networks can be improved.

15 Claims, 5 Drawing Sheets

(56) References Cited

FOREIGN PATENT DOCUMENTS

| | | | |
|---|---|---|---|
| CN | 105634785 | A | 6/2016 |
| WO | 2016022698 | A1 | 2/2016 |
| WO | 2016048430 | A1 | 3/2016 |

OTHER PUBLICATIONS

Deutsche Telekom AG:"IFA012 GS draft version 0.5.0",ETSI Draft; NFVIFA(16)0001073, European Telecommunications Standards Institute (ETSI), vol. WG-NFV IFA-Interfaces and Architecture Jul. 20, 2016, pp. 1-55, XP014277079.

"3rd Generation Partnership Project; Technical Specification Group Services and System Aspects; Telecommunication management; Study on network management of virtualized networks (Release 13)", 3GPP Standard;Technical Report;3GPP TR 32.842, vol. SA WG5, No. V13.1.0, Dec. 18, 2015, pp. 1-84, XP051294647.

\* cited by examiner

NETWORK FUNCTION PROCESSING METHOD AND RELATED DEVICE

CROSS-REFERENCE TO RELATED APPLICATIONS

This application is a continuation of International Application No. PCT/CN2016/097526, filed on Aug. 31, 2016. The disclosure of the aforementioned application is herein incorporated by reference in the entity.

TECHNICAL FIELD

Embodiments of the present invention relate to network functions virtualization, and in particular, to a system and method for network function processing.

BACKGROUND

Network functions virtualization (NFV) is a technology that is initiated by 13 global leading telecommunications operators and joined by many equipment vendors and IT vendors. The organization aims to define network functions virtualization requirements of the operators and related technical reports, and expects to implement some network functions based on software by leveraging a virtualization technology in Internet technology IT and by using a general server, switch, and memory with high performance and a large capacity. Separation between software and hardware may be implemented for various network devices by using a network functions virtualization technology, so that a server, a router, a storage device, a switch, and the like may be deployed at a data center, on a network node, or at a user home.

SUMMARY

Embodiments of the application describe a network function processing method and related devices. In one embodiment, a network function agent module can be used to construct an enhanced virtualized network function. The enhanced virtualization network function includes a virtualized network function entity and a physical network function entity, and implements a dynamic scale-out of resources of the physical network function entity, thereby improving resource utilization and reliability of hybrid networks.

According to a first aspect, an embodiment of this application provides a network function processing method that includes:

separately sending, by a network function agent module in an enhanced virtualized network function entity, a network function reconstruction request to a physical network element management module and to a virtual network element management module, the physical network element management module being connected to a physical network function entity, the virtual network element management module being connected to a virtualized network function entity, and the network function reconstruction request including connection point information;

receiving, by the physical network function entity in the enhanced virtualized network function entity, a first connection instruction sent by the physical network element management module, disconnecting from the physical network element management module, and establishing a connection to the network function agent module based on connection point information in the first connection instruction; and receiving, by the virtualized network function entity in the enhanced virtualized network function entity, a second connection instruction sent by the virtual network element management module, disconnecting from the virtual network element management module, and establishing a connection to the network function agent module based on connection point information in the second connection instruction.

In one embodiment, where after the receiving, by the virtualized network function entity in the enhanced virtualized network function entity, a second connection instruction sent by the virtual network element management module, the method further includes:

connecting, by the network function agent module in the enhanced virtualized network function entity, to a second virtualized network function entity, that is connected to the physical network function entity, and that does not belong to the enhanced virtualized network function entity; and disconnecting, by the physical network function entity in the enhanced virtualized network function entity, from the second virtualized network function entity.

In one embodiment, where after the receiving, by the virtualized network function entity in the enhanced virtualized network function entity, a second connection instruction sent by the virtual network element management module, the method further includes:

In response to detecting that a load of the physical network function entity is greater than or equal to a first preset threshold, skipping sending, by the network function agent module in the enhanced virtualized network function entity, an alarm message to the physical network element management module, and sending a resource dynamic scaling request to the virtualized network function management module, the resource dynamic scaling request being used to instruct the virtualized network function management module to send a resource allocation request to a virtualized infrastructure manager, and the resource allocation request being used to scale out the virtualized network function entity in the enhanced virtualized network function entity; and offloading, by the network function agent module in the enhanced virtualized network function entity, a new service onto the virtualized network function entity.

In one embodiment, the method further includes:

in response to detecting that a service load of the enhanced virtualized network function entity is less than or equal to a second preset threshold, sending, by the network function agent module in the enhanced virtualized network function entity, a scale-in instruction to the virtualized network function entity, and offloading all services onto the physical network function entity.

In one embodiment, the network function reconstruction request further includes resource configuration information, and the resource configuration information is used by the physical network element management module and the virtual network element management module to update a pre-stored resource configuration policy.

According to a second aspect, an embodiment of this application provides a virtualized network function processing apparatus that includes:

a network function agent module, configured to separately send a network function reconstruction request to a physical network element management module and to a virtual network element management module, the physical network element management module being connected to a physical network function entity, the virtual network element management module being connected to a virtualized network function entity, and the network function reconstruction request including connection point information;

the physical network function entity configured to: receive a first connection instruction sent by the physical network element management module, disconnect from the physical network element management module, and establish a connection to the network function agent module based on connection point information in the first connection instruction; and the virtualized network function configured to: receive a second connection instruction sent by the virtual network element management module, disconnect from the virtual network element management module, and establish a connection to the network function agent module based on connection point information in the second connection instruction.

With reference to the second aspect, in some implementations, the network function agent module is further configured to connect to a second virtualization network entity after the virtualized network function entity receives the second connection instruction sent by the virtual network element management module. The second virtualized network function entity is connected to the physical network function entity, and does not belong to the virtualized network function processing apparatus; and the physical network function entity is further configured to disconnect from the second virtualized network function entity.

In one embodiment, the network function agent module is further configured to skip sending an alarm message to the physical network element management module, and send a resource dynamic scaling request to the virtualized network function management module after the virtual network function entity receives the second connection instruction sent by the virtual network element management module, and detects that load of the physical network function entity is greater than or equal to a first preset threshold The resource dynamic scaling request is used to instruct the virtualized network function management module to send a resource allocation request to a virtualized infrastructure manager, and the resource allocation request is used to scale out the virtualized network function entity in the enhanced virtualized network function entity. The network function agent module is further configured to offload a new service onto the virtualized network function entity.

In one embodiment, the network function agent module is further configured to: send a scale-in instruction to the virtualized network function entity, and offload all services onto the physical network function entity in response to detecting that a service load of the enhanced virtualized network function entity is less than or equal to a second preset threshold.

In one embodiment, the network function reconstruction request further includes resource configuration information that is used by the physical network element management module and the virtual network element management module to update a pre-stored resource configuration policy.

According to a third aspect, an embodiment of this application provides an enhanced virtualized network function entity that includes:

a processor, a memory, a receiver, a transmitter, and a bus. The processor, the memory, the receiver, and the transmitter are connected and complete mutual communication by using the bus. The processor is configured to invoke executable program code in the memory to perform the method according to any one of claims 1 to 5.

According to a fourth aspect, an embodiment of the present invention provides a computer readable storage medium that stores program code to be performed by a computer device. The program code includes one or more execution instructions used to perform some or all steps described in any method according to the first aspect of the embodiments of the present invention.

It would be appreciated that in the network function processing method provided in this embodiment of the present invention, the enhanced virtualized network function entity includes the virtualized network function entity and the physical network function entity Therefore, from a perspective of the virtual network element management module connected to the virtualized network function entity, the enhanced virtualized network function is a common virtualized network function entity; and from a perspective of the physical network element management module connected to the physical network function entity, the enhanced virtualized network function is a common physical network function entity. As such, the enhanced virtualized network function can implement a dynamic scale-out of the resources of the physical network function entity, and improve resource utilization and reliability of hybrid networks.

BRIEF DESCRIPTION OF DRAWINGS

To describe the technical solutions in the embodiments of the present invention more clearly, the following introduces the accompanying drawings required for describing the embodiments. The accompanying drawings in the following description show some embodiments of the present invention. A person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are not all of the embodiments of the present invention. Other embodiments that can be obtained by a person of ordinary skill in the art based on the embodiments of the present invention without creative efforts shall fall within the protection scope of the present invention.

For a better understanding of the technical solutions of the present invention, the following briefly describes a system architecture of a network functions virtualization (NFV) hybrid networking system.

Figure 1A:
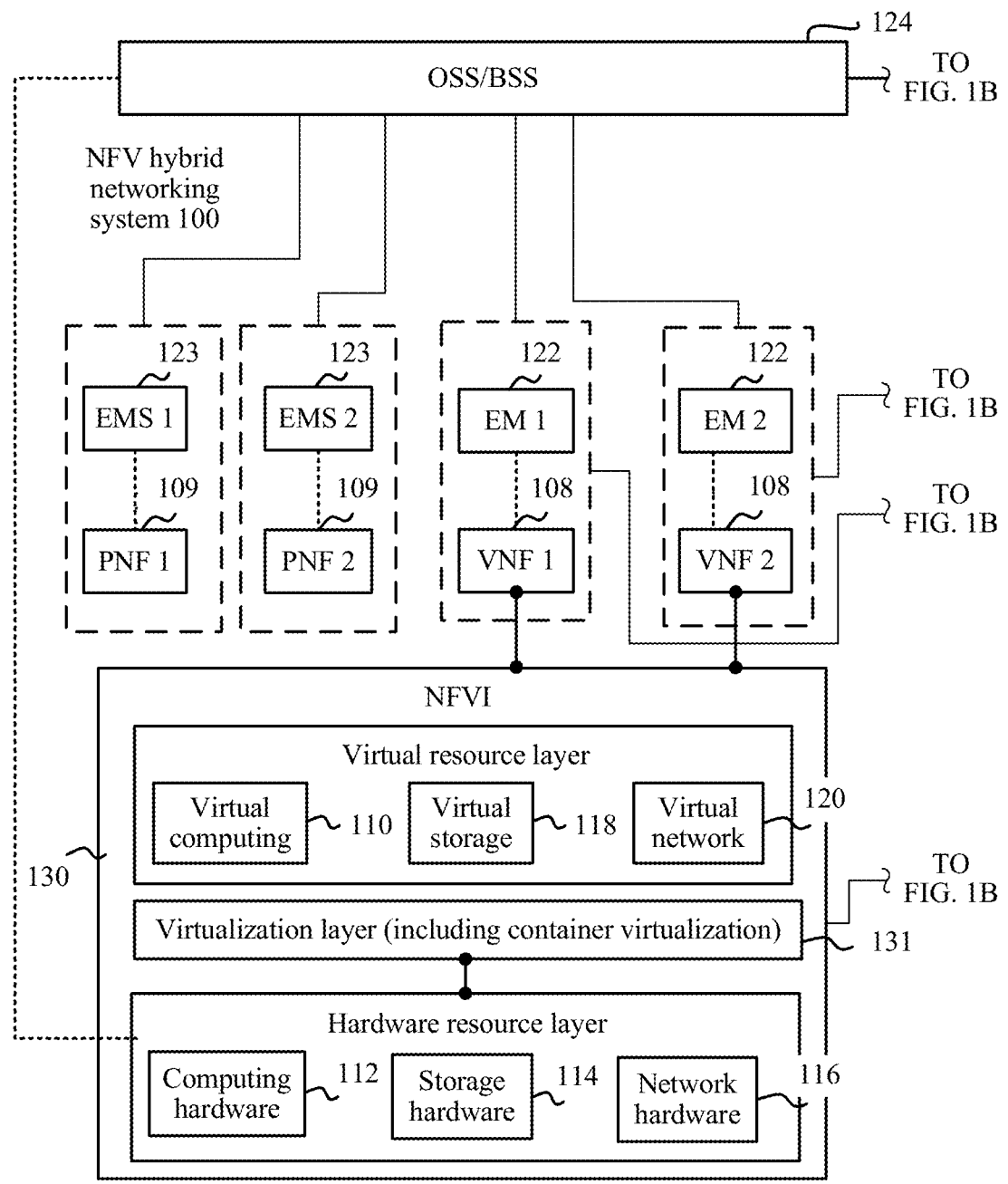
FIG. 1A and FIG. 1B are a system architectural diagram of a network functions virtualization NFV hybrid networking system 100 according to an embodiment of the present invention.
Figure 1B:
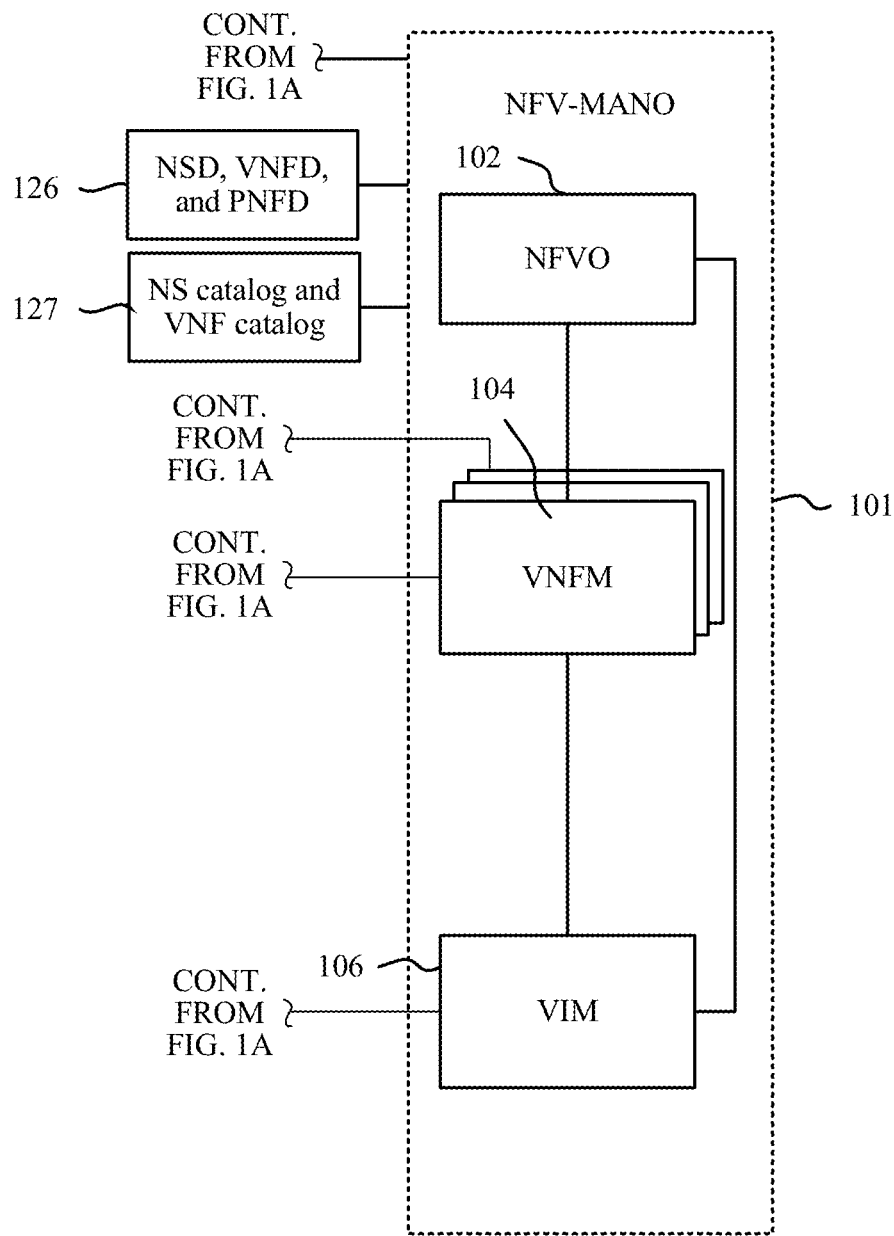

Referring to FIG. 1A and FIG. 1B, FIG. 1A and FIG. 1B illustrate a system architectural diagram of a network functions virtualization NFV hybrid networking system 100 according to an embodiment of the present invention. The NFV hybrid networking system 100 includes an NFV MANO (NFV Management and Orchestration, network functions virtualization management and orchestration system) 101, an NFVI (NFV Infrastructure, network functions virtualization infrastructure layer) 130, a plurality of VNFs (virtualized network function) 108, a plurality of PNFs (physical network function) 109, a plurality of EM (element management) 122 (also referred to as a virtual network element management module), a plurality of EMSs (element management system) (also referred to as a physical network element management module) 123, an NSD (network service description) 126, a network service catalog NS catalog and a virtualized network function catalog VNF catalog 127, and an OSS/BSS (operation-support system/business support system) 124.

The NFV MANO 101 includes an NFVO (NFV orchestrator) 102, one or more VNFMs (VNF manager) 104, and a VIM (virtualized infrastructure manager) 106. The NFVO is configured to orchestrate and manage resources based on a service request initiated by the OSS/BSS, implement an NFV service, and monitor resources and operating status information of the VNF and the NFVI in real time. The VNFM is configured to manage a VNF production cycle, such as start-up time, time-to-live, and the operating status information of the VNF, with one VNFM configured to manage one VNF. The VIM is configured to manage and allocate resources of NFVI, and monitor and collect the operating status information of the NFVI.

The EM is configured to manage the VNF, including performance monitoring, service configuration, and the like of the VNF. The EMS is configured to manage the PNF, including performance monitoring, service configuration, and the like of the PNF.

The NFVI 130 includes a hardware resource layer, a virtualization layer 131, and a virtual resource layer. The hardware resource layer includes computing hardware 112, storage hardware 114, and network hardware 116. The virtual resource layer includes virtual computing 110, virtual storage 118, and a virtualized network 120.

The OSS/BSS 124 is configured to initiate a service request, allocate resources needed by a service, and perform troubleshooting. The NS catalog is used to store all uploaded NSs, and support creation and management of deployment templates such as the NSD and a VLD. The VNF catalog is used to store all uploaded VNF packages, and support creation and management of a VNFD, a software image, and other lists.

The NFVI 130 includes a hardware resource, a software resource, or a combination of the hardware resource and the software resource, and is configured to complete deployment of a virtualized environment. The hardware resource and the virtualization layer 131 are configured to provide a virtualized resource for the VNF 108, for example, the virtualized resource is used as a virtual machine or a virtual container in another form.

The hardware resource includes the computing hardware 112, the storage hardware 114, and the network hardware 116. The computing hardware 112 may be existing hardware on the market and/or customized hardware, and is configured to provide processing and computing resources. The storage hardware 114 may be a storage capacity provided in a network or a storage capacity (which is located in a local memory of a server) residing on the storage hardware 114.

In one embodiment, resources of the computing hardware 112 and the storage hardware 114 may be integrated. The network hardware 116, for example, may be a switch, a router, and/or any other network device that is configured to have a switching function. The network hardware 116 may span a plurality of domains, and may include a plurality of networks that are interconnected by one or more transmission networks.

The virtualization layer 131 includes a plurality of virtualization technologies, a virtual machine virtualization technology, and a container virtualization technology. The virtual machine virtualization technology and the container virtualization technology may abstract resources and decouple the VNF 108, so as to provide the VNF 108 with a virtualization resource. The virtual computing 110 and the virtual storage 118 may be provided for the VNF 108 in a form of a virtual machine and/or another virtual container. For example, one or more VNFs 108 may be deployed on a virtual machine, or may be deployed in a container.

A maintenance process of the NFV hybrid networking system is as follows: (1) The NFV MANO 101 separately instantiates the VNF 108 and the PNF 109 based on the virtualized network function descriptor VNFD and a physical network function descriptor PNFD in the NSD. (2) Network connection is instantiated, and the VNF 108, the PNF 109, and the management modules EM 122 of the VNF 108 and the EMS 123 of the PNF 109 are formed into a network service NS. (3) When the VNF 108 performance is abnormal, the EM 122 triggers VNF scaling, or VNF migration, or even a fault recovery operation, to recover the VNF 108 from the abnormality. (4) When the PNF 109 is abnormal, the EMS 123 detects that the PNF 109 performance is abnormal, and then the EMS 123 performs corresponding processing, or reports the abnormality to the OSS/BSS 124 to request to recover the PNF 109 from the abnormality, including another lifecycle operation and maintenance of PNF 109. In related operations (lifecycle operations such as enabling, disabling, scale-out, and alarm processing) of the PNF 109 and VNF 108 in the same NS network, the EMS 123 is responsible for managing the related operations of the PNF 109, and the NFV MANO 101 is responsible for managing the related operations of the VNF 108.

It would be appreciated that, in the existing NFV hybrid networking system, the PNF can only be managed by the conventional EMS, and the VNF can only be managed by the EM. In this case, management and maintenance of the PNF and the VNF are performed by the two different management modules, and therefore, maintenance efficiency is not high. In addition, in the hybrid networking system, if the PNF becomes a network performance bottleneck, the hybrid networking system cannot perform dynamic resource scaling on the PNF just like on the VNF, and can only report the bottleneck to a manager to add or reduce physical cards, thereby affecting flexibility of the hybrid networking system in responding to a complex environment and affecting network experience.

Figure 2:
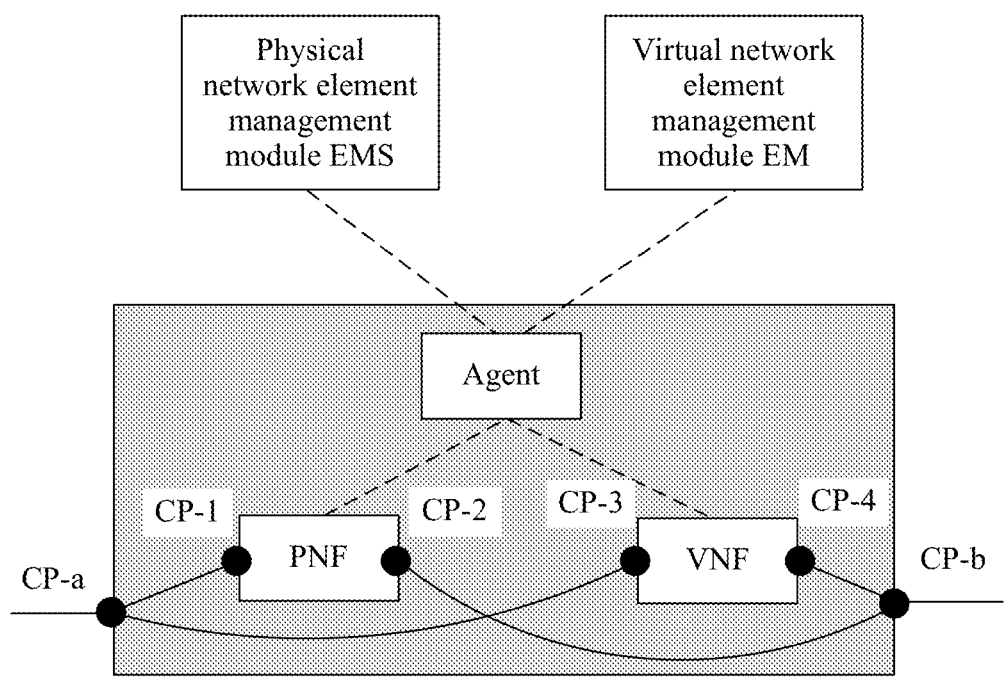
FIG. 2 is a schematic diagram of composition of an enhanced virtualized network function disclosed in an embodiment of the present invention.

According to the foregoing existing NFV hybrid networking system 100, as shown in FIG. 2, a network function agent module (Agent in FIG. 2) is added to the existing NFV hybrid networking system,. An enhanced virtualized network function (eVNF) including a virtualized network function VNF and a physical network function PNF is constructed based on the network function agent module. Specifically, CP-x in the figure represents a connection point between different modules, where CP-a/b is an external interface of the eVNF, and the CP-1/2/3/4 is an internal interface of the PNF and the VNF. The network function agent module may be specifically configured at a hardware resource layer associated with the PNF, may be configured at a hardware resource layer associated with the VNF, or may be configured at an independent hardware resource layer. This is not limited in this embodiment of the present invention.

Based on the foregoing network function agent module, an embodiment of the present invention provides a network function processing method, which is described in detail below.

Figure 3:
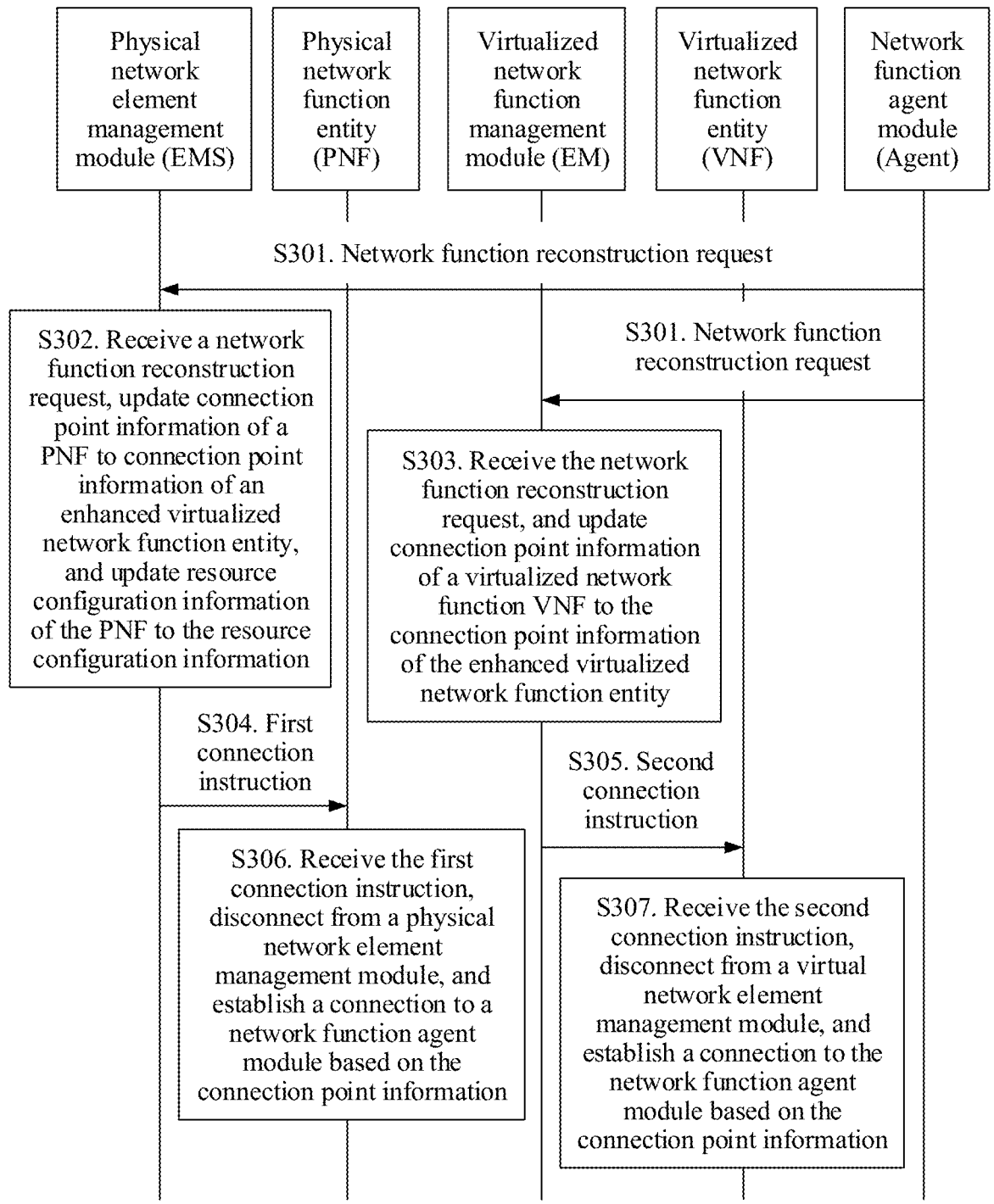
FIG. 3 is a schematic flowchart of a network function processing method according to an embodiment of the present invention.

Referring to FIG. 3, FIG. 3 is a schematic flowchart of a network function processing method according to an embodiment of the present invention. As shown in the figure, the method includes the following operations:

In operation S301, a network function agent module in an enhanced virtualized network function entity separately sends a network function reconstruction request to a physical network element management module (EMS) and a virtual network element management module (EM). The physical network element management module is connected to a physical network function PNF entity, the virtual network element management module is connected to a virtualized network function entity VNF entity, and the network function reconstruction request includes connection point information eVNF CP and resource configuration information of a to-be-created enhanced virtualized network function entity.

The physical network element management module may also be referred to as an element management system (EMS) in some standards, for example, an EMS 1 and an EMS 2 shown in FIG. 1A and FIG. 1B. The virtual network element management module may also be referred to as an element management (EM) in some standards, for example, an EM 1 and an EM 2 shown in FIG. 1A and FIG. 1B. In addition, in some standards, the EMS is not limited to managing the physical network function entity, and may further manage the virtualized network function entity. Similarly, the EM is not limited to managing the virtualized network function entity in some standards, and may further manage the physical network function entity.

The enhanced virtualized network function eVNF entity is configured with resources of an enhanced virtualized network function eVNF. The resources may include a hardware resource and a software resource of the foregoing network function agent module Agent, a hardware resource and a software resource of at least one physical network function PNF entity, and a hardware resource and a virtual resource of at least one virtualized network function VNF entity.

The resource configuration information includes permission for resource dynamic scaling, a resource utilization range, and the like.

In operation S302, the physical network element management module (EMS) receives the network function reconstruction request, updates connection point information of the physical network function PNF entity with the connection point information of the enhanced virtualized network function entity, and updates resource configuration information of the physical network function PNF entity with the resource configuration information.

In operation S303, the virtual network element management module (EM) receives the network function reconstruction request, and updates connection point information of the virtualized network function VNF entity with the connection point information of the enhanced virtualized network function entity.

In operation S304, the physical network element management module (EMS) sends a first connection instruction to the physical network function PNF entity, and disconnects from the physical network function PNF entity, where the first connection instruction includes the connection point information eVNF CP of the enhanced virtualized network function entity.

In operation S305, the virtual network element management module (EM) sends a second connection instruction to the virtualized network function VNF entity, and disconnects from the virtualized network function VNF entity, where the second connection instruction includes the connection point information eVNF CP of the enhanced virtualized network function entity.

In operation S306, the physical network function PNF entity in the enhanced virtualized network function eVNF entity receives the first connection instruction, disconnects from the physical network element management module, and establishes a connection to the network function agent module based on the connection point information eVNF CP of the enhanced virtualized network function entity.

In operation S307, the virtualized network function VNF entity in the enhanced virtualized network function eVNF entity receives the second connection instruction, disconnects from the virtual network element management module, and establishes a connection to the network function agent module based on the connection point information eVNF CP of the enhanced virtualized network function entity.

It would be appreciated that in the network function processing method provided in this embodiment of the present invention, the enhanced virtualized network function entity includes the virtualized network function entity and the physical network function entity. Therefore, from a perspective of the virtual network element management module connected to the virtualized network function entity, the enhanced virtualized network function entity is a common virtualized network function entity; and from a perspective of the physical network element management module connected to the physical network function entity, the enhanced virtualized network function entity is a common physical network function entity. As such, the enhanced virtualized network function entity can implement a dynamic scale-out of the resources of the physical network function entity, and improve resource utilization and reliability of hybrid networks.

In one embodiment, after receiving the second connection instruction, the virtualized network function VNF entity in the enhanced virtualized network function entity further performs the following operations:

connecting the network function agent module in the enhanced virtualized network function entity to a second virtualized network function entity VNF 2 entity that does not belong to the eVNF entity; and disconnecting the physical network function PNF entity in the enhanced virtualized network function entity from the second virtualized network function VNF 2 entity.

In one embodiment, after the virtualized network function entity in the enhanced virtualized network function entity receives the second connection instruction sent by the virtual network element management module, the enhanced virtualized network function eVNF entity may further perform the following operations:

in response to detecting that a load of the physical network function PNF entity is greater than or equal to a first preset threshold, skipping sending, by the network function agent module in the enhanced virtualized network function eVNF entity, an alarm message to the physical network element management module (EMS), and instead sending a resource dynamic scaling request to the VNFM, the resource dynamic scaling request being used to instruct the VNFM to send a resource allocation request to a VIM, and the resource allocation request being used to scale out the VNF in the enhanced virtualized network function eVNF entity; and offloading, by the network function agent module in the enhanced virtualized network function eVNF entity, a new service onto the virtualized network function VNF entity.

In one embodiment, the network function agent module in the enhanced virtualized network function eVNF entity further performs the following operation:

in response to detecting that a service load of the eVNF is less than or equal to a second preset threshold, sending, by the network function agent module, a scale-in instruction to the VNF entity, and offloading one or more services onto the PNF entity.

Figure 4:
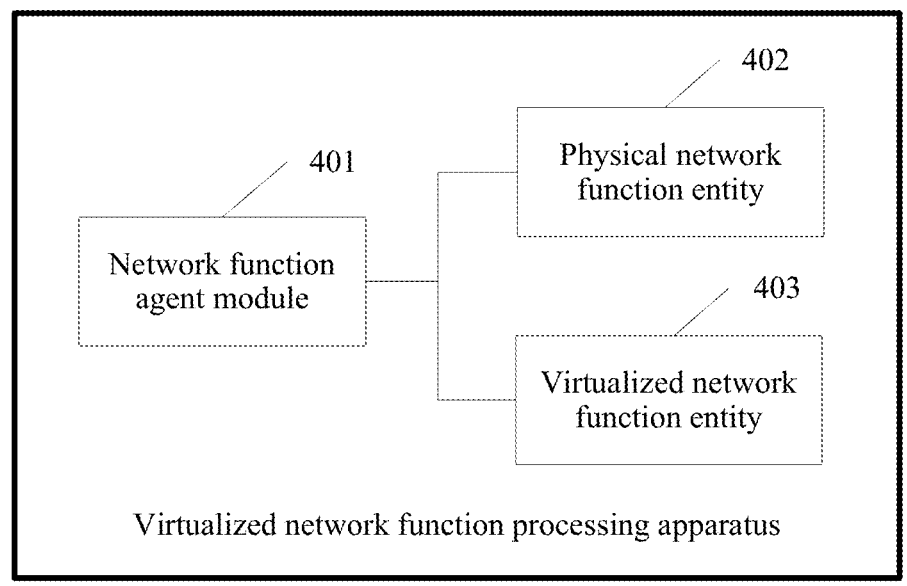
FIG. 4 is a block diagram of function units of a virtualized network function processing apparatus according to an embodiment of the present invention.

Referring to FIG. 4, FIG. 4 is a block diagram of function units of a virtualized network function processing apparatus according to an apparatus embodiment of the present invention. As shown in the figure, the apparatus includes a network function agent module 401, a physical network function entity 402, and a virtualized network function entity 403.

The network function agent module 401 is configured to separately send a network function reconstruction request to a physical network element management module and a virtual network element management module, where the physical network element management module is connected to the physical network function entity 402, the virtual network element management module is connected to the virtualized network function entity 403, and the network function reconstruction request includes connection point information.

The physical network function entity 402 is configured to: receive a first connection instruction sent by the physical network element management module, disconnect from the physical network element management module, and establish a connection to the network function agent module 401 based on connection point information in the first connection instruction.

The virtualized network function entity 403 is configured to: receive a second connection instruction sent by the virtual network element management module, disconnect from the virtual network element management module, and establish a connection to the network function agent module 401 based on connection point information in the second connection instruction.

In one embodiment, the network function agent module 401 is further configured to: after the virtualized network function entity 403 receives the second connection instruction sent by the virtual network element management module, connect to a second virtualized network function entity that is in turn connected to the physical network function entity 402.

The physical network function entity 402 is further configured to disconnect from the second virtualized network function entity.

In one embodiment, the network function agent module 401 is further configured to: skip sending an alarm message to the physical network element management module, and send a resource dynamic scaling request to the virtualized network function management module after receiving the second connection instruction sent by the virtual network element management module, the virtualized network function entity 403 detects that load of the physical network function entity 402 is greater than or equal to a first preset threshold. The resource dynamic scaling request is used to instruct the virtualized network function management module to send a resource allocation request to a virtualized infrastructure manager. The resource allocation request is used to scale out the virtualized network function entity 403 in the enhanced virtualized network function entity 403.

The network function agent module 401 is further configured to offload a new service onto the virtualized network function entity 403.

In one embodiment, the network function agent module 401 is further configured to: in response to detecting that a service load of the enhanced virtualized network function entity 403 is less than or equal to a second preset threshold, send a scale-in instruction to the virtualized network function entity 403, and offload all services onto the physical network function entity 402.

In one embodiment, the network function reconstruction request further includes resource configuration information used by the physical network element management module and the virtual network element management module to update a pre-stored resource configuration policy.

It should be noted that the virtualized network function processing apparatus described in this apparatus embodiment of the present invention is presented in a form of a function unit. The term "unit" used herein should be understood as having a meaning as broad as possible. An object for implementing a described function of each "unit" may be, for example, an integrated circuit ASIC, a single circuit, a processor (shared, dedicated, or chip set) that is configured to perform one or more software or firmware programs, a memory, a combined logic circuit, and/or another suitable component that provides or implements the function.

Figure 5:
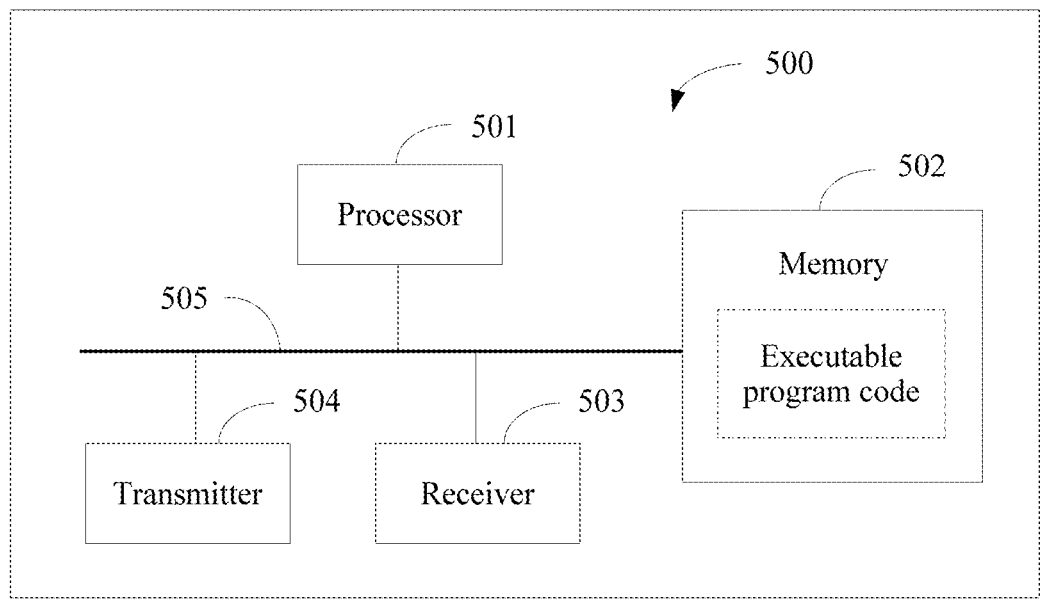
FIG. 5 is a schematic structural diagram of an enhanced virtualized network function entity according to an embodiment of the present invention.

For example, a person skilled in the art may consider that the virtualized network function processing apparatus may be specifically an enhanced virtualized network function entity shown in FIG. 5.

It would be appreciated that in a method for constructing the enhanced virtualized network function provided in this embodiment of the present invention, the newly constructed enhanced virtualized network function entity includes the virtualized network function entity and the physical network function entity. Therefore, from a perspective of the virtual network element management module connected to the virtualized network function entity, the enhanced virtualized network function is a common virtualized network function entity; and from a perspective of the physical network element management module connected to the physical network function entity, the enhanced virtualized network function is a common physical network function entity. As such, the enhanced virtualized network function can implement a dynamic scale-out of resources of the physical network function entity, and improve resource utilization and reliability of hybrid networking.

Referring to FIG. 5, FIG. 5 is a schematic structural diagram of an enhanced virtualized network function entity according to an embodiment of the present invention. As shown in the figure, the enhanced virtualized network function entity 500 provided in this embodiment of the present invention includes a processor 501, a memory 502, a receiver 503, a transmitter 504, and a bus 505. The processor 501, the memory 502, the receiver 503, and the transmitter 504 are connected and complete mutual communication by using the bus 505.

The processor 501 is configured to invoke executable program code in the memory 502 to perform the following operations:

separately sending, by the transmitter 504, a network function reconstruction request to a physical network element management module and to a virtual network element management module, the physical network element management module being connected to a physical network function entity, the virtual network element management module being connected to a virtualized network function entity, and the network function reconstruction request including connection point information;

receiving, by the receiver 503, a first connection instruction sent by the physical network element management module, disconnecting from the physical network element management module, and establishing a connection to a network function agent module based on connection point information in the first connection instruction; and receiving, by the receiver 503, a second connection instruction sent by the virtual network element management module, disconnecting from the virtual network element management module, and establishing a connection to the network function agent module based on connection point information in the second connection instruction.

It would be appreciated that in the enhanced virtualized network function entity provided in this embodiment of the present invention, the enhanced virtualized network function entity includes the virtualized network function entity and the physical network function entity. Therefore, from a perspective of the virtual network element management module connected to the virtualized network function entity, the enhanced virtualized network function entity is a common virtualized network function entity; and, from a perspective of the physical network element management module connected to the physical network function entity, the enhanced virtualized network function entity is a common physical network function entity. As such, the enhanced virtualized network function entity can implement a dynamic scale-out of resources of the physical network function entity, and improve resource utilization and reliability of hybrid networking.

In one embodiment, after the second connection instruction sent by the virtual network element management module is received by using the receiver 503, the processor 501 is further configured to:

establish a connection from the network function agent module to a second virtualized network function entity, where the second virtualized network function entity is connected to the physical network function entity; and disconnect the physical network function entity from the second virtualized network function entity.

In one embodiment, after the second connection instruction sent by the virtual network element management module is received by using the receiver 503, the processor 501 is further configured to:

in response to detecting that a load of the physical network function entity is greater than or equal to a first preset threshold, skip sending an alarm message to the physical network element management module, and send a resource dynamic scaling request to the virtualized network function management module, the resource dynamic scaling request being used to instruct the virtualized network function management module to send a resource allocation request to a virtualized infrastructure manager, the resource allocation request being used to scale out the virtualized network function entity in the enhanced virtualized network function entity; and offload a new service onto the virtualized network function entity.

In one embodiment, the processor 501 is further configured to:

in response to detecting that a service load of the enhanced virtualized network function entity is less than or equal to a second preset threshold, send a scale-in instruction to the virtualized network function entity, and offload all services onto the physical network function entity.

In one embodiment, the network function reconstruction request further includes resource configuration information used by the physical network element management module and the virtual network element management module to update a pre-stored resource configuration policy.

It should be noted that the processor 501 herein may be one processor, or may be a collective term of a plurality of processing elements. For example, the processor may be a central processing unit (CPU), or an application specific integrated circuit (ASIC), or may be configured as one or more integrated circuits implementing this embodiment of the present invention, for example, one or more microprocessors (DSP) or one or more field programmable gate arrays (FPGA).

The memory 502 may be one storage apparatus, or may be a collective term of a plurality of storage elements, and is configured to store executable program code or a parameter, data, and the like that are required for running an access network management device. The memory 502 may include a random access memory (RAM), or may include a non-volatile memory, such as a magnetic disk storage or a flash memory (Flash).

The bus 505 may be an industry standard architecture (ISA) bus, a peripheral component interconnect (PCI) bus, an extended industry standard architecture (EISA) bus, or the like. The bus 505 may be classified into an address bus, a data bus, a control bus, and the like. For ease of representation, only one thick line is used to represent the bus in FIG. 5, but this does not mean that there is only one bus or only one type of bus.

In the embodiment shown in FIG. 4, a function of each unit may be implemented based on a structure of the enhanced virtualized network function entity. In the foregoing embodiments shown in FIG. 3, each step and method process may be based on the enhanced virtualized network function entity shown in FIG. 5.

An embodiment of the present invention further provides a computer storage medium. The computer storage medium may store a program, and when the program is executed, some or all of the steps of any network function processing method in the foregoing method embodiments may be performed.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely used as an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in computer-readable storage. Based on such an understanding, the technical solutions of the present invention essentially, or the part contributing to the prior art, or all or some of the technical solutions may be implemented in the form of a software product. The software product is stored in a storage and includes several instructions for instructing a computer device (which may be a personal computer, a server, or a network device) to perform all or some of the steps of the methods described in the embodiments of the present invention. The foregoing storage includes: any medium that can store program code, such as a USB flash drive, a read-only memory (ROM), a random access memory (RAM), a removable hard disk, a magnetic disk, or an optical disc.

The embodiments of the present invention are described in detail above. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A method for network function processing, comprising:
separately sending, by a network function agent module in an enhanced virtualized network function entity, a network function reconstruction request to a physical network element management module and to a virtual network element management module, wherein the physical network element management module is connected to a physical network function entity, wherein the virtual network element management module is connected to a virtualized network function entity, and wherein the network function reconstruction request comprises connection point information;
receiving, by the physical network function entity in the enhanced virtualized network function entity, a first connection instruction sent by the physical network element management module, disconnecting from the physical network element management module, and establishing a connection to the network function agent module based on connection point information in the first connection instruction; and
receiving, by the virtualized network function entity in the enhanced virtualized network function entity, a second connection instruction sent by the virtual network element management module, disconnecting from the virtual network element management module, and establishing a connection to the network function agent module based on connection point information in the second connection instruction.

2. The method according to claim 1, further comprising:
after receiving, by the virtualized network function entity in the enhanced virtualized network function entity, a second connection instruction sent by the virtual network element management module, performing the operations of:
connecting, by the network function agent module in the enhanced virtualized network function entity, to a second virtualized network function entity, wherein the second virtualized network function entity is connected to the physical network function entity; and
disconnecting, by the physical network function entity in the enhanced virtualized network function entity, from the second virtualized network function entity.

3. The method according to claim 1, further comprising after receiving, by the virtualized network function entity in the enhanced virtualized network function entity, a second connection instruction sent by the virtual network element management module, performing the opeations of:
in response to detecting that a load of the physical network function entity is greater than or equal to a first preset threshold, skipping sending, by the network function agent module in the enhanced virtualized network function entity, an alarm message to the physical network element management module, and sending a resource dynamic scaling request to the virtualized network function management module, wherein the resource dynamic scaling request is used to instruct the virtualized network function management module to send a resource allocation request to a virtualized infrastructure manager, and wherein the resource allocation request is used to scale out the virtualized network function entity in the enhanced virtualized network function entity; and
offloading, by the network function agent module in the enhanced virtualized network function entity, a new service onto the virtualized network function entity.

4. The method according to claim 3, further comprising:
in response to detecting that a service load of the enhanced virtualized network function entity is less than or equal to a second preset threshold, sending, by the network function agent module in the enhanced virtualized network function entity, a scale-in instruction to the virtualized network function entity, and offloading all services onto the physical network function entity.

5. The method according to claim 1, wherein the network function reconstruction request further comprises resource configuration information that is used by the physical network element management module and the virtual network element management module to update a pre-stored resource configuration policy.

6. A virtualized network function processing apparatus, comprising:
- a network function agent module, configured to separately send a network function reconstruction request to a physical network element management module and to a virtual network element management module, wherein the physical network element management module is connected to a physical network function entity, wherein the virtual network element management module is connected to a virtualized network function entity, and wherein the network function reconstruction request comprises connection point information;
- wherein the physical network function entity is configured to: receive a first connection instruction sent by the physical network element management module, disconnect from the physical network element management module, and establish a connection to the network function agent module based on connection point information in the first connection instruction; and
- wherein the virtualized network function entity is configured to: receive a second connection instruction sent by the virtual network element management module, disconnect from the virtual network element management module, and establish a connection to the network function agent module based on connection point information in the second connection instruction.

7. The apparatus according to claim 6, wherein
the network function agent module is further configured to: after the virtualized network function entity receives the second connection instruction sent by the virtual network element management module, connect to a second virtualized network function entity, wherein the second virtualized network function entity is connected to the physical network function entity; and
wherein the physical network function entity is further configured to disconnect from the second virtualized network function entity.

8. The apparatus according to claim 6, wherein
the network function agent module is further configured to: in response to the virtualized network function entity detecting that a load of the physical network function entity is greater than or equal to a first preset threshold after receiving the second connection instruction sent by the virtual network element management module, skip sending an alarm message to the physical network element management module, and send a resource dynamic scaling request to the virtualized network function management module, wherein the resource dynamic scaling request is used to instruct the virtualized network function management module to send a resource allocation request to a virtualized infrastructure manager, and wherein the resource allocation request is used to scale out the virtualized network function entity in the enhanced virtualized network function entity; and
wherein the network function agent module is further configured to offload a new service onto the virtualized network function entity.

9. The apparatus according to claim 8, wherein
the network function agent module is further configured to: in response to detecting that a service load of the enhanced virtualized network function entity is less than or equal to a second preset threshold, send a scale-in instruction to the virtualized network function entity, and offload all services onto the physical network function entity.

10. The apparatus according to claim 6, wherein the network function reconstruction request further comprises resource configuration information, that is used by the physical network element management module and the virtual network element management module to update a pre-stored resource configuration policy.

11. A non-transitory machine-readable medium having instructions stored therein for network function processing, the instructions, when executed by a processor, causing the processor to perform operations, the operations comprising:
separately sending, by a network function agent module in an enhanced virtualized network function entity, a network function reconstruction request to a physical network element management module and to a virtual network element management module, wherein the physical network element management module is connected to a physical network function entity, wherein the virtual network element management module is connected to a virtualized network function entity, and wherein the network function reconstruction request comprises connection point information;
receiving, by the physical network function entity in the enhanced virtualized network function entity, a first connection instruction sent by the physical network element management module, disconnecting from the physical network element management module, and establishing a connection to the network function agent module based on connection point information in the first connection instruction; and
receiving, by the virtualized network function entity in the enhanced virtualized network function entity, a second connection instruction sent by the virtual network element management module, disconnecting from the virtual network element management module, and establishing a connection to the network function agent module based on connection point information in the second connection instruction.

12. The non-transitory machine-readable medium according to claim 11, further comprising:
after receiving, by the virtualized network function entity in the enhanced virtualized network function entity, a second connection instruction sent by the virtual network element management module, performing the operations of:
connecting, by the network function agent module in the enhanced virtualized network function entity, to a second virtualized network function entity, wherein the second virtualized network function entity is connected to the physical network function entity; and
disconnecting, by the physical network function entity in the enhanced virtualized network function entity, from the second virtualized network function entity.

13. The non-transitory machine-readable medium according to claim 11, further comprising
after receiving, by the virtualized network function entity in the enhanced virtualized network function entity, a second connection instruction sent by the virtual network element management module, performing the opeations of:
in response to detecting that a load of the physical network function entity is greater than or equal to a first preset threshold, skipping sending, by the network function agent module in the enhanced virtualized network function entity, an alarm message to the physical network element management module, and sending a resource dynamic scaling request to the virtualized network function management module, wherein the resource dynamic scaling request is used to instruct the virtualized network function management module to send a resource allocation request to a virtualized infrastructure manager, and wherein the resource allocation request is used to scale out the virtualized network function entity in the enhanced virtualized network function entity; and offloading, by the network function agent module in the enhanced virtualized network function entity, a new service onto the virtualized network function entity.

14. The non-transitory machine-readable medium according to claim 13, further comprising:

in response to detecting that a service load of the enhanced virtualized network function entity is less than or equal to a second preset threshold, sending, by the network function agent module in the enhanced virtualized network function entity, a scale-in instruction to the virtualized network function entity, and offloading all services onto the physical network function entity.

15. The non-transitory machine-readable medium according to claim 11, wherein the network function reconstruction request further comprises resource configuration information that is used by the physical network element management module and the virtual network element management module to update a pre-stored resource configuration policy.

* * * * *